US008094991B2

(12) United States Patent
Taoka

(10) Patent No.: US 8,094,991 B2
(45) Date of Patent: Jan. 10, 2012

(54) METHODS AND APPARATUS FOR RECORDING AND REPRODUCING A MOVING IMAGE, AND A RECORDING MEDIUM IN WHICH PROGRAM FOR EXECUTING THE METHODS IS RECORDED

(75) Inventor: Mineki Taoka, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 12/327,027

(22) Filed: Dec. 3, 2008

(65) Prior Publication Data

US 2009/0154895 A1    Jun. 18, 2009

(30) Foreign Application Priority Data

Dec. 14, 2007    (JP) .................. 2007-323930

(51) Int. Cl.
*H04N 5/932* (2006.01)
*H04N 5/935* (2006.01)
(52) U.S. Cl. ...................... 386/201; 386/210
(58) Field of Classification Search .......... 386/201, 386/210, 224, 248
See application file for complete search history.

(56) References Cited

U.S. PATENT DOCUMENTS

| 7,688,360 | B2* | 3/2010 | Maeda | 348/231.1 |
| 2004/0212694 | A1* | 10/2004 | Miki | 348/231.2 |
| 2006/0061667 | A1* | 3/2006 | Tunoda | 348/222.1 |
| 2007/0139536 | A1* | 6/2007 | Watanabe | 348/231.99 |
| 2009/0066799 | A1* | 3/2009 | Whitcombe | 348/208.5 |

FOREIGN PATENT DOCUMENTS

| JP | 2001-103356 A | 4/2001 |
| JP | 2002-320203 A | 10/2002 |

* cited by examiner

*Primary Examiner* — Thai Tran
*Assistant Examiner* — Nigar Chowdhury
(74) *Attorney, Agent, or Firm* — Drinker Biddle & Reath LLP

(57) ABSTRACT

Apparatus and methods for recording and reproducing a moving image in which image data having a frame rate is easily reproduced together with audio data when images are simultaneously recorded with different frame rates when a moving image is imaged, and a recording medium in which a program for executing the methods is recorded. The apparatus and methods employ, for example, a timing detector an image processor, a frame number obtaining unit, and a medium recording unit recording which operate to reproduce image data with synchronized audio and video and record image data on a recording medium.

16 Claims, 4 Drawing Sheets

METHODS AND APPARATUS FOR RECORDING AND REPRODUCING A MOVING IMAGE, AND A RECORDING MEDIUM IN WHICH PROGRAM FOR EXECUTING THE METHODS IS RECORDED

CROSS-REFERENCE TO RELATED PATENT APPLICATIONS

This application claims the benefit of Japanese Patent Application No. 2007-323930, filed on Dec. 14, 2007, in the Japanese Intellectual Property Office, the entire contents of which being incorporated herein by reference.

BACKGROUND OF THE INVENTION

1. Field of the Invention

The present invention relates to methods and apparatus for recording and reproducing a moving image, and a recording medium in which a program for executing the methods is recorded.

2. Description of the Related Art

Imaging apparatuses, such as video cameras or camcorders, in which a moving image can be recorded, perform image processing (e.g., development processing) on a signal output from each pixel of an imaging device, such as a charge coupled device (CCD), and then, perform compression processing, such as MPEG-2 or Motion JPEG, etc., to record image data on a recording medium, such as a flash memory, a hard disc drive (HDD), or a digital versatile disc (DVD). The image processing includes, for example, white balance control and exposure control. In addition, imaging apparatuses capable of imaging a moving image include an imaging apparatus for imaging a moving image at higher speed than a frame rate according to TV standards. When a moving image recorded by the imaging apparatus is reproduced on a conventional display device, the moving image can be displayed by selecting a frame rate suitable for the conventional display device.

For example, Japanese Patent Laid-open Publication No. 2001-103356 discloses a technology in which an imaging apparatus images a moving image at a high speed and simultaneously, a display unit outputs only an image that coincides with a synchronization signal generated at a predetermined period, so that an image apparatus that can display a moving image on a conventional display device is constituted. In addition, Japanese Patent Laid-open Publication No. 2002-320203 discloses a technology for recording time information in one frame unit when an imaging operation is performed by changing the frame rate of a moving image.

Conventionally, as compression processing is performed after image processing is performed, the quality for recording and reproducing an image is lowered as compared to data before compression processing is performed. Thus, in imaging apparatuses, such as a digital camera for recording a still image, compression processing is not performed, and a signal output from an imaging device is directly recorded in its raw format. However, in imaging apparatuses, such as a camcorder for recording a moving picture, a signal is recorded in its raw format and the amount of processing on images increases. Thus, the signal is stored in a reduced image, and the reduced image is usually used during a development operation of the imaging apparatus or during reproduction by the imaging apparatus.

When raw image data is recorded as data of a moving image, development processing is required to reproduce the raw image data. However, when higher speed imaging, as compared to a usual case, is performed, when all frames are developed, the amount of processing becomes enormous. In addition, when audio data is recorded at a frame rate corresponding to high-speed imaging and is reproduced at a frame rate corresponding to reproduction, the audio data is reproduced at a conventional reproduction frame rate due to frame blur, and as a result, all of the audio data are not read and voice is divided into parts.

SUMMARY OF THE INVENTION

The present invention therefore provides methods and apparatus for recording and reproducing a moving image whereby image data having a frame rate is easily reproduced together with audio data when images are simultaneously recorded with different frame rates when a moving image is imaged, and a recording medium in which a program for executing the methods is recorded.

Accordingly, an embodiment of the present invention provides an apparatus for recording a moving image. The apparatus includes a first synchronization signal generator for generating a first synchronization signal having a variable frame rate, a second synchronization signal generator for generating a second synchronization signal having a fixed frame rate, a timing detector for detecting frame timing of the first synchronization signal that is generated to be the same as or closest to the second synchronization signal, and an image processor image-processing raw image data that is sequentially output from an imaging device in one frame unit at a first frame rate according to the first synchronization signal so as to be reproducible image data and generating processing-completed image data in one frame unit at a second frame rate, according to the second synchronization signal. The apparatus further includes an audio signal processor for generating audio data in one frame unit at the second frame rate, a frame number obtaining unit for calculating the number of frames that exist between frames containing audio data, within frame timing that is detected by the timing detector, and a medium recording unit for sequentially recording the raw image data in one frame unit on a recording medium at the first frame rate and recording the processing-completed image data, the audio data, and the number of frames in one frame unit within the frame timing that is detected by the timing detector, on the recording medium.

Another embodiment of the present invention provides another apparatus for recording a moving image. The apparatus includes a first synchronization signal generator for generating a first synchronization signal having a variable frame rate, a second synchronization signal generator for generating a second synchronization signal having a fixed frame rate, a timing detector for detecting frame timing of the first synchronization signal that is generated to be the same as or closest to the second synchronization signal, a first image processor for generating first image data in one frame unit at a first frame rate according to the first synchronization signal, and a second image processor generating second image data in one frame unit at a second frame rate, according to the second synchronization signal. The apparatus further includes an audio signal processor for generating audio data in one frame unit at the second frame rate, a frame number obtaining unit for calculating the number of frames that exist between frames containing audio data, within frame timing that is detected by the timing detector, and a medium recording unit for sequentially recording the first image data in one frame unit on a recording medium at the first frame rate and recording the second image data, the audio data, and the number of frames in one frame unit within the frame timing that is detected by the timing detector, on the recording medium.

A further embodiment of the present invention provides an apparatus for reproducing a moving image. The apparatus includes a data reader for reading at least one of each of the following: raw image data, processing-completed image data, audio data, and the number of frames from a recording medium in which the raw image data in one frame unit and having a first frame rate according to a first synchronization signal having a variable frame rate is sequentially recorded. The processing-completed image data can be in one frame unit within a frame timing of the first synchronization signal that is generated to be the same as or closest to a second synchronization signal having a fixed frame rate of the first synchronization signal in which the raw image data is image-processed to be reproducible, and the audio data can be in one frame unit within the frame timing and the number of frames that exist between frames containing audio data. The apparatus further includes an audio signal processor for reading and audio-processing the audio data according to the read number of frames when the raw image data is sequentially reproduced in one frame unit.

Another embodiment of the present invention provides an apparatus for reproducing a moving image. The apparatus includes a data reader for reading at least one of each of the following: first image data, second image data, audio data, and a number of frames from a recording medium in which the first image data is in one frame unit and has a first frame rate according to a first synchronization signal having a variable frame rate is sequentially recorded, the second image data is in one frame unit within frame timing of the first synchronization signal that is generated to be the same as or closest to a second synchronization signal having a fixed frame rate of the first synchronization signal, and the audio data is in one frame unit within the frame timing and the number of frames that exist between frames containing audio data. The apparatus further includes an audio signal processor for reading and audio-processing the audio data according to the read number of frames when the first image data is sequentially reproduced in one frame unit.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EMBODIMENTS

Figure 1:
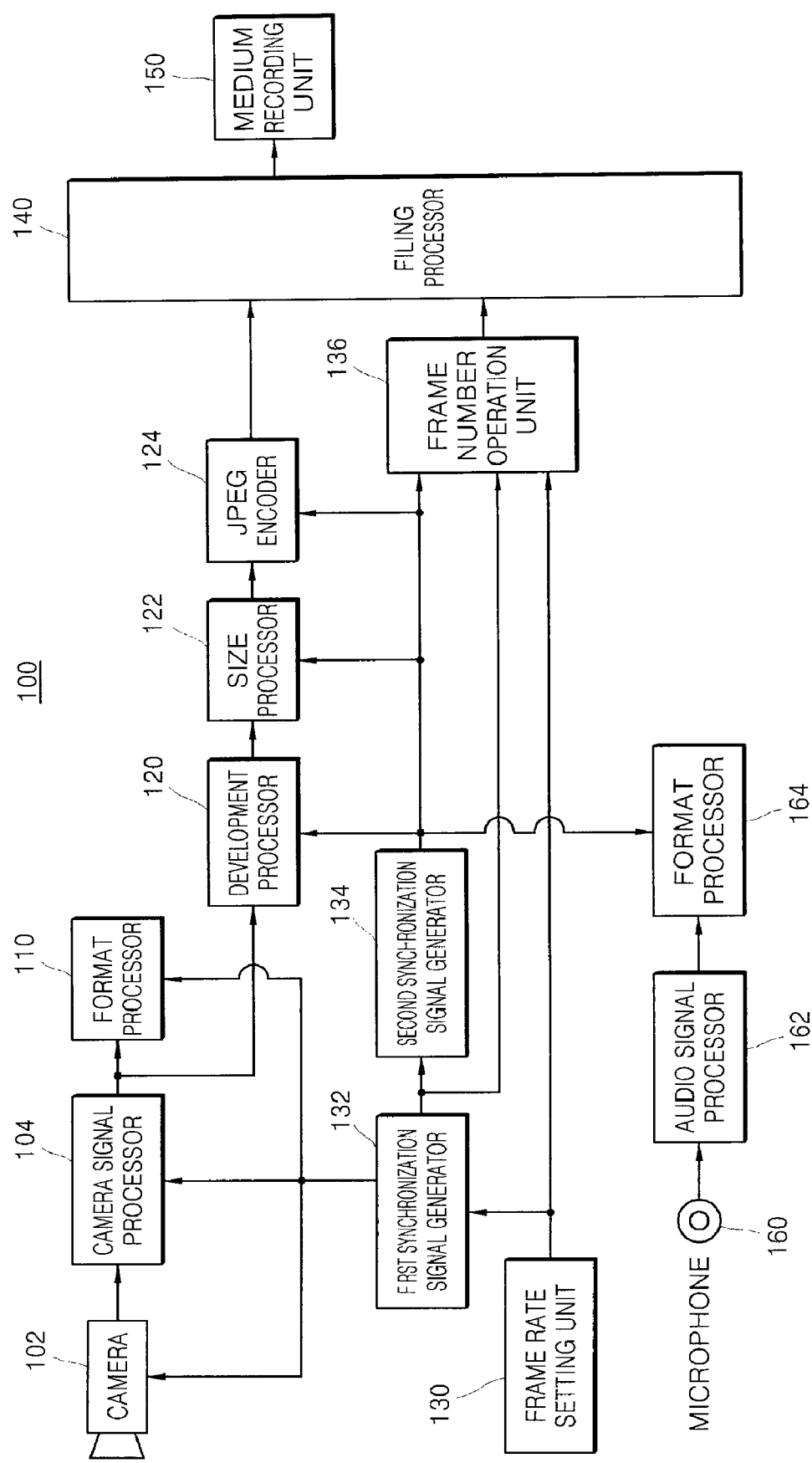
FIG. 1 is a block diagram illustrating an example of an apparatus for recording a moving image according to an embodiment of the present invention.

Hereinafter, exemplary embodiments of the present invention will be described with reference to the attached drawings. In addition, in the specification and the drawings, like reference numerals are given to elements having substantially the same functions, thereby omitting a repeated description.

FIG. 1 is a block diagram illustrating an apparatus 100 for recording a moving image, according to an embodiment of the present invention. The apparatus 100 for recording a moving image comprises a camera 102, a camera signal processor 104, a format processor 110, a development processor 120, a size processor 122, a JPEG encoder 124, a frame rate setting unit 130, a first synchronization signal generator 132, a second synchronization signal generator 134, a frame number operation unit 136, a filing processor 140, a medium recording unit 150, a microphone 160, an audio signal processor 162, and a format processor 164.

Moving image data in one frame unit output by an imaging device of the camera 102 or a sensor, such as complementary metal oxide semiconductor (CMOS), is input to the camera signal processor 104. The camera signal processor 104 comprises an analog-to-digital converter (ADC) to AD convert input signals. A digital image signal output from the camera signal processor 104 is transmitted to the format processor 110 and the development processor 120, respectively.

The format processor 110 performs a process for re-aligning each of the digital-converted signals R, G, and B according to a pixel arrangement (ex. Bayer arrangement or 3-plate CCD etc.) of the imaging device. In addition, the format processor 110 performs reversible compression processing on the moving image data within a frame. Due to compression processing by using a reversible compression method, image data can be recorded and reproduced without deterioration of picture quality etc. The reversible compression method includes entropy encoding using Huffman codes, for example. However, the reversible compression method is not strictly limited to entropy encoding, and thus, can be other ones.

In format processing by the format processor 110, in order to maintain a picture quality as raw image data, compression processing is not performed so as to not deteriorate picture quality. Also, the raw image data has a very large file size and thus is processed as data having a small redundancy. The moving image data that is format-processed by the format processor 110 is input to the filing processor 140 as the raw image data that is maintained raw. In addition, in the raw image data, a frame is generated at a frame rate according to a first synchronization signal output from the first synchronization signal generator 132.

The development processor 120 performs a series of development processes, such as Bayer white balance processing, Bayer interpolation processing, noise removing, and brightness and color correction, etc., on the input moving image data. The moving image data on which development processing is performed by the development processor 120 is transmitted to the size processor 122. The size processor 122 performs a process of reducing or increasing the size of the moving image data. The moving image data output from the size processor 122 is transmitted to the JPEG encoder 124. In addition, the size processor 122 performs a process of reducing the size of the moving image data according to the size of a screen of a display device, such as an electronic view finder (EVF)(not shown) or a liquid crystal display (LCD)(not shown), when necessary. The moving image data output from the size processor 122 is transmitted to the EVF or LCD and is displayed on the screen of the display device. Accordingly, a user may recognize an image imaged by the camera 102 in real time.

The JPEG encoder 124 performs compression encoding, such as JPEG, on the input moving image data and transmits compressed image data (processing-completed image data)

to the filing processor 140. In the compressed image data, a frame is generated at a frame rate according to a second synchronization signal output from the second synchronization signal generator 134.

The frame rate setting unit 130 sets a frame rate of the camera 102 or a frame rate when each raw image data, compressed image data, and audio data is generated. Data with the set frame rate is transmitted to the first synchronization signal generator 132 or the frame number operation unit 136.

The first synchronization signal generator 132 generates the first synchronization signal of the imaging device of the camera 102 according to data transmitted from the frame rate setting unit 130. The generated first synchronization signal is transmitted to the camera 102, the camera signal processor 104, and the format processor 110. In addition, the first synchronization signal generator 132 transmits data on the set first synchronization signal to the second synchronization signal generator 134 and the frame number operation unit 136.

The second synchronization signal generator 134 generates a second synchronization signal which is a reference when compressed image data is generated, according to the data transmitted from the frame rate setting unit 130 by means of the first synchronization signal generator 132. The second synchronization signal generated by the second synchronization signal generator 134 has a frequency of 59.94 Hz corresponding to a National Television System Committee (NTSC) standard, for example. The generated second synchronization signal is transmitted to the development processor 120, the size processor 122, the JPEG encoder 124, and the format processor 164 regarding audio. In addition, the second synchronization signal generator 134 transmits data on the set second synchronization signal to the frame number operation unit 136.

When the camera 102 images at higher speed than a conventional frame rate, the imaging device is operated with an equal or a higher frequency than a frequency with which the second synchronization signal generator 134 operates. For example, when the frequency of the second synchronization signal is 59.94 Hz, the first synchronization signal generator 132 generates a first synchronization signal having the frequency of 59.94 Hz or higher.

The frame number operation unit 136, an example of a timing detection unit and a frame number acquisition unit, receives a value that is set by the frame rate setting unit 130 or data on the first synchronization signal output from the first synchronization signal generator 132 or data on the second synchronization signal output from the second synchronization signal generator 134, and detects frame timing of the first synchronization signal that is generated to be the same as or closest to the second synchronization signal. The frame number operation unit 136 calculates the number of frames that exist between frames containing audio data (or the number of frames within frame timing), so that the location of the frame of audio data recorded within the detected frame timing is checked. The frame number operation unit 136 format-processes data on the number of frames that exist between frames containing audio data, wherein the number of frames is calculated by the frame number operation unit 136, and transmits the data to the filing processor 140.

The filing processor 140 temporarily accumulates raw image data having a first frame rate for high-speed imaging according to the first synchronization signal transmitted from the format processor 110 or compressed image data having a second frame rate in a conventional reproduction mode according to the second synchronization signal compression-encoded by the JPEG encoder 124 or audio data having a second frame rate transmitted from the format processor 164. The compressed image data, the raw image data, and the audio data accumulated by the filing processor 140 are transmitted to the medium recording unit 150 and are recorded on a recording medium, according to a recording format of a recording medium. In addition, the filing processor 140 temporarily accumulates data on the number of frames on each frame transmitted from the frame number operation unit 136 and records the data together with the raw image data, the compressed image data, and the audio data, on the recording medium. The recording medium may include an optical recording medium, such as a CD, a DVD, a magneto-optical disk, a magnetic disk, and a semiconductor memory medium, etc.

In addition, the microphone 160 acquires voice of a subject simultaneously with a moving image imaged by the camera 102 and transmits the obtained voice to the audio signal processor 162. The audio signal processor 162 includes an ADC to AD convert analog signals of input voice. The digital voice signal output from the audio signal processor 162 is transmitted to the format processor 164. The format processor 164 formats the audio data by compression processing, such as a non-compression pulse code modulation (PCM) method, an adaptive differential pulse code modulation (ADPCM) method, an advance audio coding (AAC) method, an audio code number 3 (AC3) method or a MPEG audio layer-3 (MP3) method etc. The audio data formatted by the format processor 164 is input to the filing processor 140. The filing processor 140 temporarily accumulates the audio data. In addition, in the audio data, data is generated at a frame rate according to the second synchronization signal output from the second synchronization signal generator 134.

In addition, although not shown, the apparatus 100 further comprises a host central processing unit (CPU) to control transmission of data from the filing processor 140 to the medium recording unit 150 and recording of data on the recording medium by the medium recording unit 150. The host CPU transmits the compressed image data, the raw image data, and the audio data, which are accumulated by the filing processor 140, and the data on the number of frames as calculated by the frame number operation unit 136 to the medium recording unit 150 according to a predetermined amount (ex. according to the data amount of one frame) and controls the filing processor 140 and the medium recording unit 150 so that the data are sequentially recorded on the recording medium. The host CPU records the compressed image data, the raw image data, the audio data, and the data on the number of frames on the recording medium in a predetermined order. In addition, a series of processing performed by the apparatus 100 for recording a moving image may be processed in hardware or software using a computer program. In the apparatus 100 according to an embodiment of the present invention, the image digital data that is output from the imaging device of the camera 102, is AD converted and is transmitted to the format processor 110, and the raw image data that is maintained raw is recorded on the recording medium. Thus, high-quality raw image data can be recorded in the recording medium and read and displayed, thereby reproducing an image of higher quality as compared to compressed image data.

However, the size of raw image data is large. Thus, the raw image data cannot be displayed on a screen of an EVF or LCD in real time, and compression processing, such as JPEG, cannot be performed on the raw image data. In the apparatus 100 according to the present embodiment of the present invention, development processing, reduction processing, and compression processing of the moving image data is performed together with the recording of the raw image data such that real time display can be performed on the EVF or LCD simultaneously with the imaging of the image on a display screen being monitored. In addition, since the compressed image data that is compression-encoded together with the raw image data is recorded on the recording medium, searching for an image and a thumbnail display, for example, can be performed using the compressed image data during reproduction. Accordingly, high-quality reproduction using the raw image data can be performed on an important portion of an image, and the compressed image data on a less-important portion of the image is read at a high speed, thereby performing play back reproduction.

In addition, in the apparatus 100 for recording a moving image, according to the present embodiment of the present invention, the raw image data imaged that is maintained raw at a high speed is retained at a frame rate according to the first synchronization signal, and the audio data is recorded within the frame timing of the first synchronization signal that is generated to be the same as or closest to the second synchronization signal of the first synchronization signal and detected by the frame number operation unit 136. The audio data in one frame unit is not recorded at the same frame rate as the raw image data but is intermittently recorded to have a nearly constant frame rate, and thus, reproduction of an image and voice can be easily performed in a conventional reproduction mode, such as an NTSC standard.

In addition, since data on the number of frames that exist between frames containing audio data, in which the audio data together with the raw image data is recorded, is recorded on the recording medium, when the raw image data is development-processed during reproduction, the data on the number of frames can be read and development-processed. As a result, the frame in which the audio data is recorded can be easily extracted, and a frame for reproducing a moving image in a conventional reproduction mode can be development-processed, generated, and reproduced according to the raw image data.

Figure 2:
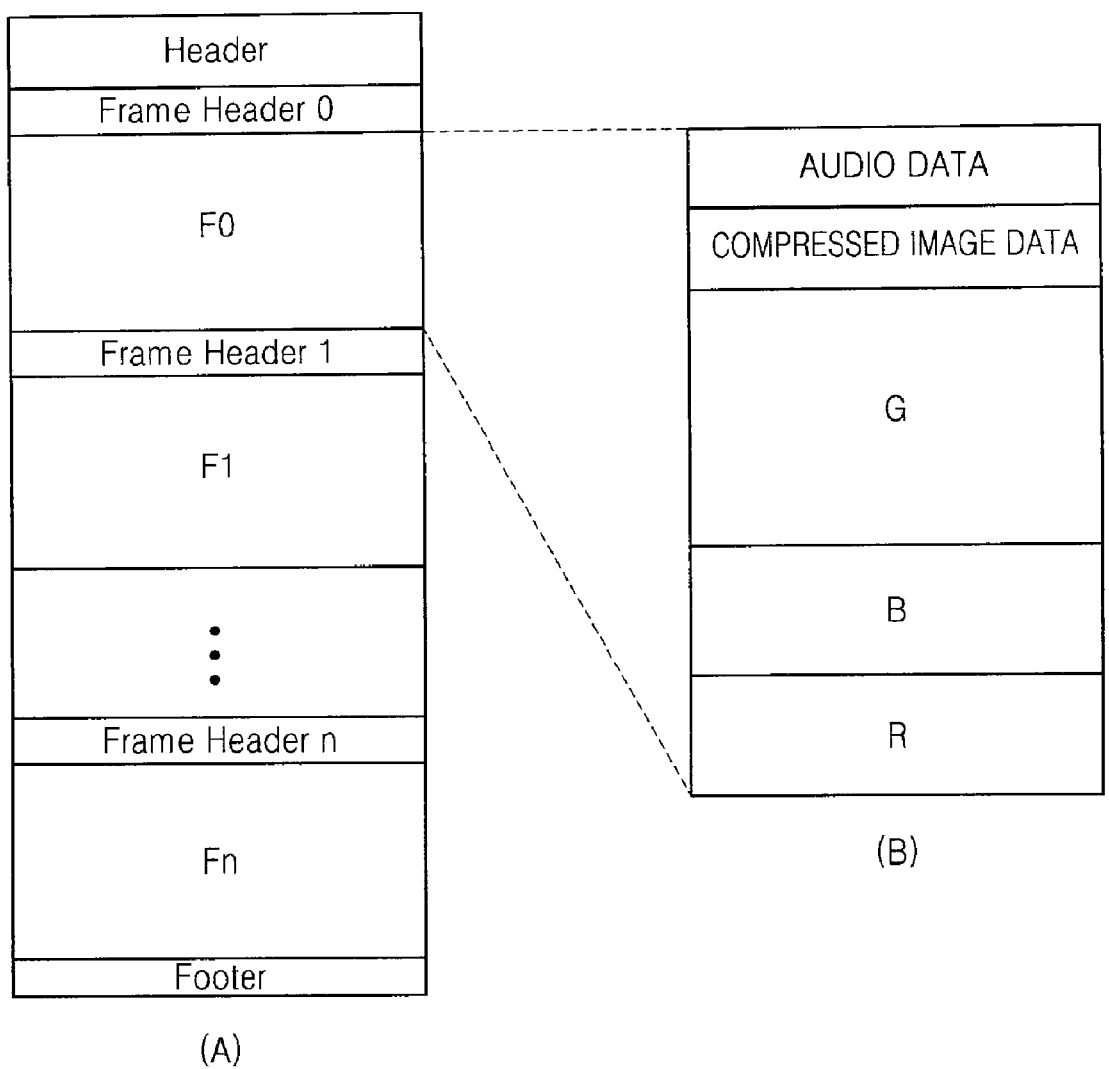
FIG. 2 illustrates an example of a recording format of a recording medium included in the apparatus illustrated in FIG. 1.

An example of a recording format of the recording medium will be described. FIG. 2 illustrates the recording format of the recording medium included in the apparatus 100 illustrated in FIG. 1. When the imaging device has a single plate in a Bayer arrangement, for example, data is output in the order of pixels in a Bayer arrangement of R:G:B=1:2:1. The apparatus 100 for recording a moving image records data in a Bayer arrangement while deteriorating picture quality of the data and thus re-aligns the data in the order of R, G, and B by using the format processor 110, and records the data without compression-processing so as to not deteriorates picture quality.

FIG. 2(A) illustrates one moving image file from the start of recording of an image (vide recording start) to the stop of recording (video recording stop). In addition, FIG. 2(B) illustrates data in one frame unit of recorded data of FIG. 2(A).

The RGB data in a Bayer arrangement is re-aligned by the format processor 110 and is recorded in a data area of the recording medium. In addition, the compressed image data that is encoded by the JPEG encoder 124 and the audio data that is formatted by the format processor 164 are recorded in the data area of the recording medium. As illustrated in FIG. 2(A), a header is recorded in the head of the recording format. In the header, all the information, such as information on the imaging device of the camera 102, names of a set of the apparatus 100 for recording a moving image, the number of audio channels, information on the recording format of the recording medium, and specification data of a lens of the camera 102 are recorded. Subsequent to the header, data is recorded in one frame unit of an image.

Frame units respectively comprise frame headers 0 through n and data in frames F0 through Fn. As illustrated in FIG. 2(B), data in one frame unit is repeatedly recorded in each one frame unit in the order of audio data, compressed image data, and raw image data (G, B, R). Subsequent to data of a final frame Fn, a Footer is recorded.

In a frame header of each frame, the sizes of audio data, compressed image data, and raw image data of each frame are recorded. In addition, in the frame header of each frame, data on the number of frames that exist between frames containing audio data, is recorded, wherein the number of frames is calculated by the frame number operation unit 136.

Figure 3:
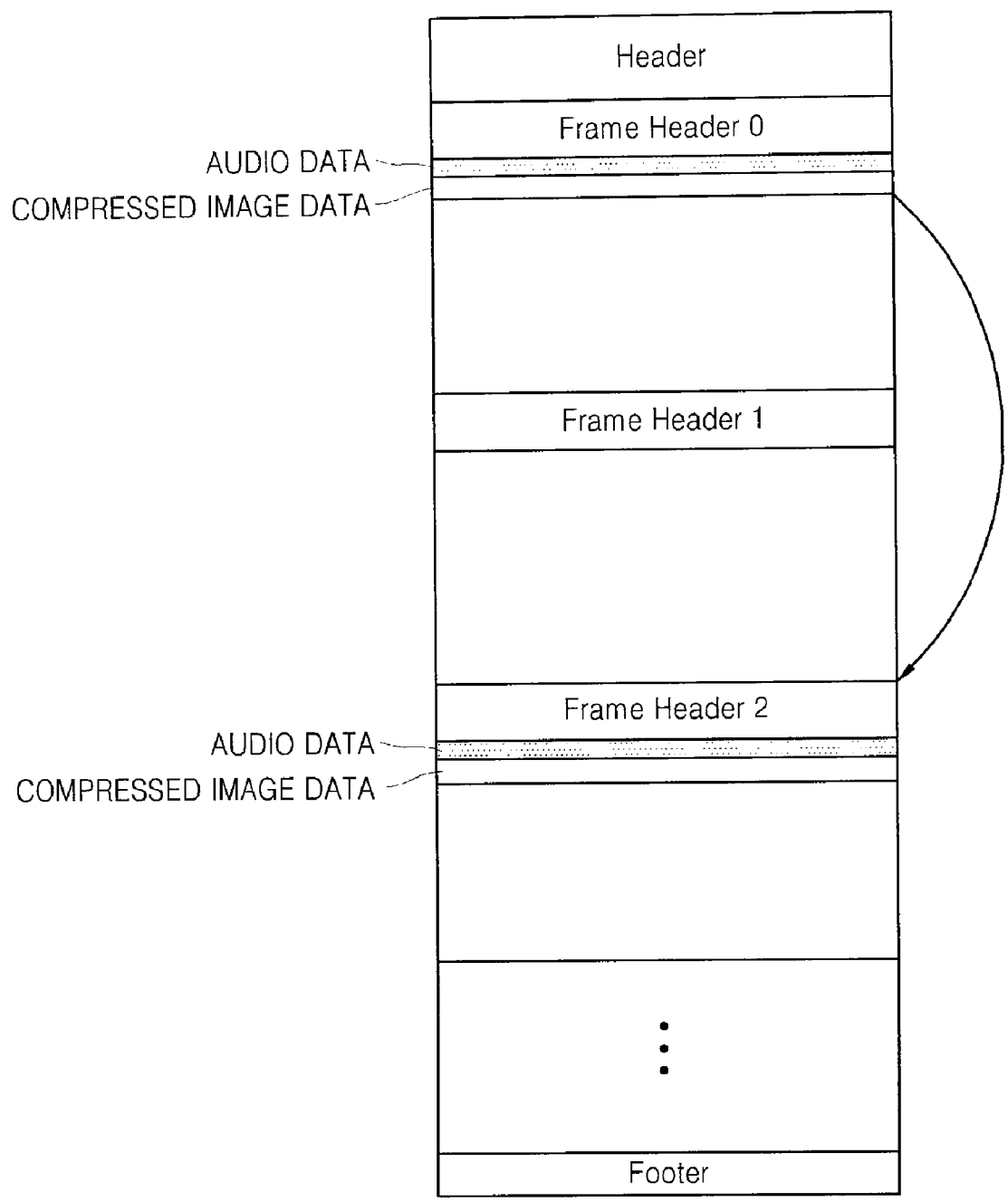
FIG. 3 illustrates an example of a recording format of the recording medium included in the apparatus illustrated in FIG. 1 and a data reproduction example.

Data in which audio data is recorded and reproduction of the data will be described with reference to FIG. 3. FIG. 3 illustrates an example of a recording format of a recording medium included in the apparatus 100 illustrated in FIG. 1 and a data reproduction example.

As already described with reference to FIGS. 2(A) and 2(B), the recording format is subsequent to the frame header in the order of audio data, compressed image data, and raw image data. When data is recorded by the apparatus 100, according to the present embodiment of the present invention, the audio data is recorded within the frame timing of the first synchronization signal that is generated to be the same as or closest to the second synchronization signal of the first synchronization signal and detected by the frame number operation unit 136. Thus, the audio data does not exist in the frame. Thus, the number of frames in which the audio data exists is recorded in the frame header. FIG. 3 illustrates the case where the number of frames in which the audio data exists is recorded as 2 in the frame header 0. As such, a next frame in which the audio data does not exist allows the audio data of the previous frame to be smoothly reproduced.

An example of an apparatus for reproducing a moving image recorded in the apparatus 100 illustrated in FIG. 1 will now be described with reference to FIG. 4.

Figure 4:
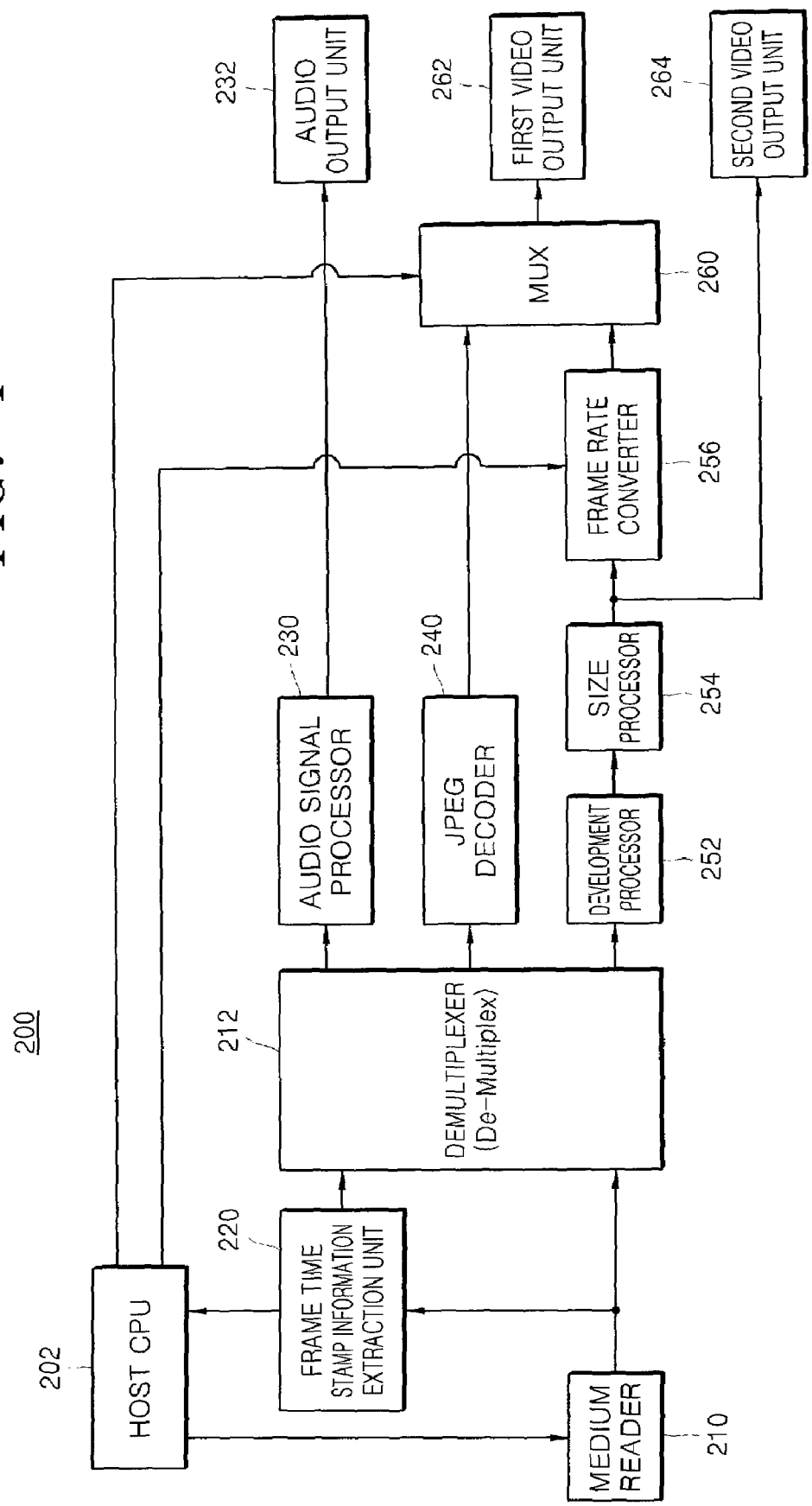
FIG. 4 is a block diagram illustrating an example of an apparatus for reproducing a moving image, according to an embodiment of the present invention.

FIG. 4 is a block diagram illustrating an example an apparatus 100 for reproducing a moving image, according to an embodiment of the present invention. Referring to FIG. 4, the apparatus 200 for reproducing a moving image comprises a host CPU 202, a medium reader 210, a demultiplexer 212, a frame time stamp information extraction unit 220, an audio signal processor 230, an audio output unit 232, a JPEG decoder 240, a development processor 252, a size processor 254, a frame rate converter 256, a multiplexer (MUX) 260, a first video output unit 262, and a second video output unit 264.

The medium reader 210 reads data from the recording medium according to an instruction from the host CPU 202. The demultiplexer 212 gathers data read by the recording medium reader 210 temporarily and transmits the data to the audio signal processor 230, the JPEG decoder 240, and the development processor 252, respectively.

The frame time stamp information extraction unit 220 extracts data on the number of frames that exist between frames containing audio data, and transmits the extracted data to the host CPU 202. The host CPU 202 controls image processing performed by the frame rate converter 256 according to the number of frames transmitted by the frame time stamp information extraction unit 220. Accordingly, when the number of frames is read from the recording medium, frame rate conversion is performed by the frame rate converter 256 according to the extracted data on the number of frames. Thus, in development processing of the raw image data, a development process can be performed at a frame rate according to the frame rate of the audio data and thus moving image reproduction that is appropriate to the audio data can be performed.

The audio signal processor 230 deformats the audio data, digital-to-analog (DA) converts the deformatted audio data into an analog signal and then transmits the analog audio signal to the audio output unit 232. The audio output unit 232 externally outputs the audio analog signal. In addition, the JPEG decoder 240 decodes the compressed image data, reduces or increases the decoded image data, and transmits the reduced or increased image data to the MUX 260.

The development processor 252 Bayer-deformats the raw image data, re-aligns the deformatted raw image data in a Bayer arrangement, and transmits the re-aligned raw image data to the size processor 254. The development processor 252 performs a series of development processes such as Bayer white balance processing, Bayer interpolation processing, noise removing, and brightness and color correction, etc., on the deformatted raw moving image data. The size processor 254 reduces the size of the raw image data on which development processing is performed, and transmits the size-reduced data to the frame rate converter 256 or the second video output unit 264. The frame rate converter 256 transmits the raw image data that is development processed according to the number of frames that is extracted by the frame time stamp information extraction unit 220, to the MUX 260.

The MUX 260 transmits the image data that is transmitted from the JPEG decoder 240 or the size processor 254 to the first video output unit 262. The first video output unit 262 DA converts the transmitted data and externally outputs the analog signal data. As a result, the first video output unit 262 outputs image data that is appropriate to the frame rate of the audio data.

The image data, as the data output from the size processor 254, is transmitted to the first vide output unit 264. As a result, the second video output unit 264 outputs image data at a first frame rate when the raw image data is recorded. In addition, a series of processes performed by the apparatus 200 for reproducing a moving image may be performed in hardware or software using a computer program.

In the apparatus 200 for reproducing a moving image having the above configuration, according to the present embodiment of the present invention, frame rate conversion is performed using the total number of frames in which the audio data exists and of which information on the audio data is recorded in each frame header of the file read by the medium reader 210. Generally, when all of the raw image data is reproduced at a high-speed imaging frame rate at which the raw image data is recorded, the amount of processing is enormous. However, by using the apparatus 200 for reproducing a moving image, development processing of the raw image data is performed based on the number of frames in which audio data exists such that an appropriate moving image can be reproduced together with the audio data. In addition, when the audio data is recorded at a high-speed imaging frame rate at which the raw image data is recorded and a moving image is reproduced in a conventional reproduction mode, complicated processing on additional audio data is necessary. According to the present embodiment of the present invention, the audio data is recorded at nearly the same frame rate as that of the conventional reproduction mode such that special processing on the audio data during reproduction is unnecessary.

When the raw image data is reproduced, each of the raw image data, such as G, B, and R data, is read from the recording medium, and the data is development processed such that the raw image data is changed into an image signal. The image signal is reduced to a predetermined image size and is output to the first video output unit 262. As such, the apparatus 200 for reproducing a moving image can perform high-quality reproduction.

When the compressed image data is reproduced, the compressed image data is sequentially read from the recording medium in one frame units such that the compressed image data can be reproduced. In this case, the size of read data is much smaller than the raw image data. A JPEG-decoded image signal is reduced or increased to a predetermined image size and is output such that reproduction can be more easily performed as compared to reproduction of the raw image data. A play back mode by using the compressed image data is used such that the hardware structure of the apparatus 200 for reproducing a moving image can be greatly reduced and power consumption can be greatly reduced.

In addition, even in a high-speed reproduction mode, as a specific reproduction mode, JPEG data is used such that processing with a small load can be performed. In this case, only a necessary frame may be interlaced from information on the sizes of the audio data while only the frame header is searched according to the compact disk access time of reproduction, and the compressed image data may be read and JPEG-decoded. Reproduction in a reverse form to the recording can be easily performed using the same method as that of the recording.

Furthermore, the compressed image data may be used, and a list of imaged images of the file may be displayed in the form of thumbnails. In this case, for example, on each of several moving image files, an image of one frame may be displayed in the form of a thumbnail, and each moving image file may be displayed as a moving image in the form of a thumbnail.

As described above, according to the present invention, both of the raw image data and the compressed image data can be recorded such that the raw image data can be used during high-quality reproduction and the compressed image data having a small data amount can be used during real time display or image search etc. As such, the apparatus 100 for recording a moving image and the apparatus 200 for reproducing a moving image having high quality and excellent manipulability can be provided. As further described above, image data having a frame rate can be easily reproduced together with audio data, when images are simultaneously recorded with different frame rates when images are simultaneously recorded with different frame rates and a moving image is imaged.

As can also be appreciated from the above, the raw image data and the compressed image data are recorded in the recording medium according to the recording format of FIG. 2. However, the present invention is not limited to this. For example, the present invention can be applied to the case where first image data having a first frame rate, second image data having a second frame rate that is different from the first frame rate, and audio data having a second frame rate are recorded in the recording medium according to the recording format of FIG. 2. As such, by referring to data on the number of frames that exist between frames containing audio data, it is easy to refer to the audio data having a second frame rate.

While this invention has been particularly shown and described with reference to exemplary embodiments thereof, it will be understood by one skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for recording a moving image, the apparatus comprising:
   a first synchronization signal generator which generates a first synchronization signal having a variable frame rate;
   a second synchronization signal generator which generates a second synchronization signal having a fixed frame rate;
   a timing detector which detects frame timing of the first synchronization signal that is generated to be the same as or closest to the second synchronization signal;
   an image processor which image-processes raw image data that is sequentially output from an imaging device in one frame unit at a first frame rate according to the first synchronization signal so as to be reproducible image data and generating processing-completed image data in one frame unit at a second frame rate, according to the second synchronization signal;
   an audio signal processor which generates audio data in one frame unit at the second frame rate;
   a frame number obtaining unit which calculates the number of frames that exist between frames containing audio data, within frame timing that is detected by the timing detector; and
   a medium recording unit which sequentially records the raw image data in one frame unit on a recording medium at the first frame rate and recording the processing-completed image data, the audio data, and the number of frames in one frame unit within the frame timing that is detected by the timing detector, on the recording medium.

2. An apparatus as claimed in claim 1, wherein the image processor comprises:
   a first image processor which generates the raw image data as first image data in the one frame unit at the first frame rate according to the first synchronization signal; and
   a second image processor which generates the processing-completed image data as second image data in the one frame unit at the second frame rate, according to the second synchronization signal.

3. An apparatus as claimed in claim 1, wherein the image processor comprises:
   a format processor which format-processes the raw image data according to the first synchronization signal so as to be the reproducible image data; and
   at least one of a developmental processor, size processor and encoder which operates to generate the processing-completed image data according to the second synchronization signal.

4. An apparatus for reproducing a moving image, the apparatus comprising:
   a data reader reading at least one of each of first image data, second image data, audio data, and a number of frames from a recording medium in which the first image data in one frame unit and having a first frame rate according to a first synchronization signal having a variable frame rate is sequentially recorded, the second image data being in one frame unit within a frame timing of the first synchronization signal that is generated to be the same as or closest to a second synchronization signal having a fixed frame rate of the first synchronization signal, and the audio data being in one frame unit within the frame timing and the number of frames that exist between frames containing audio data; and
   an audio signal processor reading and audio-processing the audio data according to the read number of frames when the first image data is sequentially reproduced in one frame unit.

5. An apparatus as claimed in claim 4, wherein:
   the first image data is raw image data; and
   the second image data is processing-completed image data in the one frame unit within the frame timing of the first synchronization signal that is generated to be the same as or closest to the second synchronization signal having the fixed frame rate of the first synchronization signal in which the raw image data is image-processed to be reproducible.

6. An apparatus as claimed in claim 4, further comprising:
   a demultiplexer which gathers the first image data, second image data, audio data, and the number of frames read by the data reader, transmits the audio data to the audio signal processor, and transmits the first image data and second image data to a decoder and a development processor.

7. A method of recording a moving image, the method comprising:
   generating a first synchronization signal having a variable frame rate;
   generating a second synchronization signal having a fixed frame rate;
   detecting frame timing of the first synchronization signal that is generated to be the same as or closest to the second synchronization signal;
   generating first image data in one frame unit at a first frame rate, according to the first synchronization signal;
   generating second image data in one frame unit at a second frame rate, according to the second synchronization signal;
   generating audio data in one frame unit at the second frame rate;
   calculating the number of frames that exist between frames containing audio data, within frame timing that is detected by the timing detector; and
   sequentially recording the first image data in one frame unit on a recording medium at the first frame rate and recording the second image data, the audio data, and the number of frames in one frame unit within the frame timing that is detected by the timing detector, on the recording medium.

8. A method as claimed in claim 7, wherein:
   the first image data is raw image data, which is generated so as to be reproducible image data; and
   the second image data is processing-completed image data.

9. A method as claimed in claim 7, further comprising:
   operating a format processor to format-process the raw image data according to the first synchronization signal so as to be the reproducible image data; and
   operating at least one of a developmental processor, size processor and encoder to generate the processing-completed image data according to the second synchronization signal.

10. A method of reproducing a moving image, the method comprising:
    reading at least one of each of first mage data, second image data, audio data, and the number of frames from a recording medium in which the first image data in one frame unit having a first frame rate according to a first synchronization signal having a variable frame rate is sequentially, the second image data being in one frame unit within frame timing of the first synchronization signal that is generated to be the same as or closest to a second synchronization signal having a fixed frame rate of the first synchronization signal, and the audio data being in one frame unit within the frame timing and the number of frames that exist between frames containing audio data; and reading and audio-processing the audio data according to the read number of frames when the first image data is sequentially reproduced in one frame unit.

11. A method as claimed in claim 10, wherein:
the first image data is raw image data; and
the second image data is processing-completed image data.

12. A method as claimed in claim 10, further comprising:
operating a demultiplexer to gather the first image data, second image data, audio data, and the number of frames read during, transmit the audio data to the audio signal processor, and transmit the first image data and second image data to a decoder and a development processor.

13. A non-transitory recording medium in which a program loaded in an apparatus for recording a moving image is stored, wherein the program controls the apparatus to perform the following operations:

generating a first synchronization signal having a variable frame rate;

generating a second synchronization signal having a fixed frame rate;

detecting frame timing of the first synchronization signal that is generated to be the same as or closest to the second synchronization signal;

generating first image data in one frame unit at a first frame rate, according to the first synchronization signal;

generating second image data in one frame unit at a second frame rate, according to the second synchronization signal;

generating audio data in one frame unit at the second frame rate;

calculating the number of frames that exist between frames containing audio data, within frame timing that is detected by the timing detector; and sequentially recording the first image data in one frame unit on a recording medium at the first frame rate and recording the second image data, the audio data, and the number of frames in one frame unit within the frame timing that is detected by the timing detector, on the recording medium.

14. A recording medium as claimed in claim 13, wherein:
the first image data is raw image data; and
the second image data is processing-completed image data.

15. A non-transitory recording medium in which a program loaded in an apparatus for recording a moving image is stored, wherein the program controls the apparatus to perform the following operations:

reading at least one of each of first mage data, second image data, audio data, and the number of frames from a recording medium in which the first image data in one frame unit having a first frame rate according to a first synchronization signal having a variable frame rate is sequentially recorded, the second image data being in one frame unit within frame timing of the first synchronization signal that is generated to be the same as or closest to a second synchronization signal having a fixed frame rate of the first synchronization signal, and the audio data in one frame unit being within the frame timing and the number of frames that exist between frames containing audio data; and reading and audio-processing the audio data according to the read number of frames when the first image data is sequentially reproduced in one frame unit.

16. A recording medium as claimed in claim 15, wherein:
the first image data is raw image data; and
the second image data is processing-completed image data.

* * * * *